Sept. 4, 1934.    H. J. SAUER    1,972,246
REAR VISION MIRROR BRACKET
Filed June 24, 1932
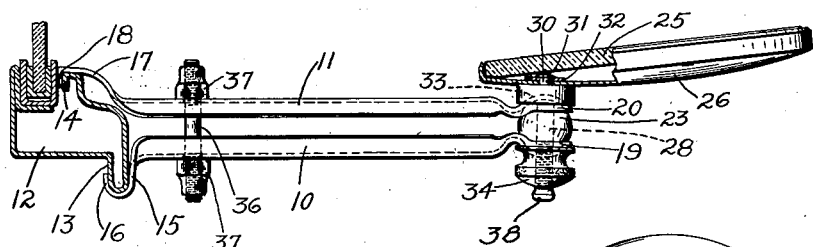
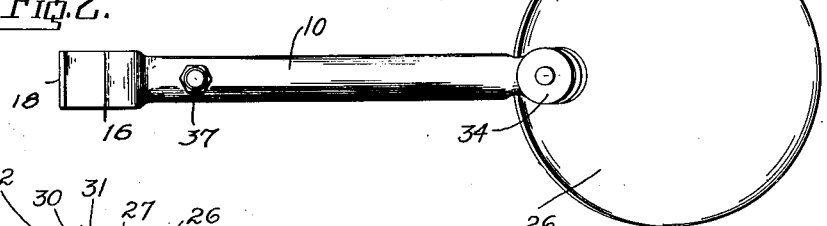
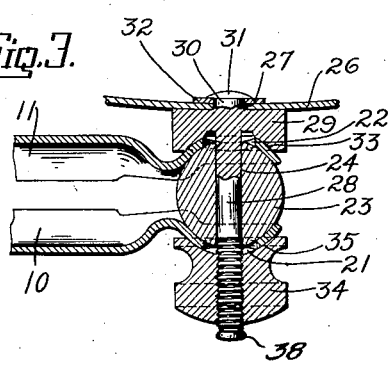
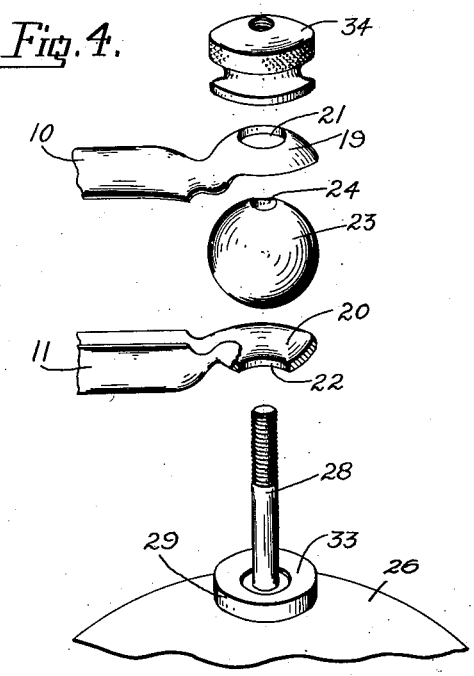
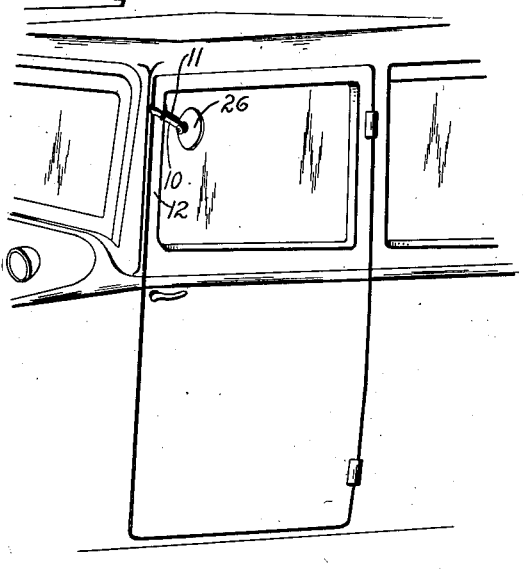
Inventor
HENRY J. SAUER,
By
Attorney Patented Sept. 4, 1934

1,972,246

UNITED STATES PATENT OFFICE 1,972,246

REAR-VISION-MIRROR BRACKET

Henry J. Sauer, Fairfield, Conn., assignor to The Kilborn-Sauer Company, Fairfield, Conn., a corporation of Connecticut Application June 24, 1932, Serial No. 619,068

4 Claims. (Cl. 45—97)

The present invention relates to a rear-vision-mirror bracket particularly adapted for securing on the frame of an automobile door at its edge opposed to the hinged edge, the invention being especially adapted for use on front automobile doors which are hinged along their rearward edges. An object of the invention is to provide a clamping means which may be clamped about the door frame so as to effectually position and support the mirror against displacement through vibration and opening and closing of the door, and which will not interfere with the operation of the door, and to this end I propose to provide a novel clamping means including clamping portions adapted to respectively engage between the window frame and the door frame and about the overlap flange of the door frame. A further object is to provide a support for the mirror which will permit of its convenient adjustment without disturbing the position of the bracket. Other objects are to provide a bracket which will be of simple and inexpensive construction, attractive in appearance, and reliable in use.

With the above and other objects in view an embodiment of the invention is shown in the accompanying drawing, and this embodiment will be hereinafter more fully described with reference thereto and the invention will be finally pointed out in the claims.

In the drawing:

Fig. 1 is a plan view, partially in section, of the rear-vision-mirror bracket, according to the illustrated exemplary embodiment of the invention, the door frame to which it is attached being shown in horizontal section.

Fig. 2 is a view in elevation of the forward side of the bracket, the back of the mirror being shown.

Fig. 3 is an enlarged detail sectional view of the adjustable mirror connection.

Fig. 4 is a perspective view showing the parts of the mirror connection in separated relation.

Fig. 5 is a perspective view of a portion of an automobile, and showing the bracket mounted thereon.

Similar reference characters indicate corresponding parts throughout the several figures of the drawing.

Referring to the drawing the bracket according to the illustrated exemplary embodiment of the invention comprises a pair of bracket arms 10 and 11, preferably in the form of sheet metal stampings of concavo-convex cross-section having their concave sides faced toward each other. At one end the arms are adapted to be clamped to the door frame 12, which includes a window groove 14 and an overlap flange 13, and for this purpose the arm 10 is flattened at its end, as at 15, and bent forwardly and into hook form, as at 16, to provide a hook portion for engaging about the flange 13. The arm 11 is also flattened at its end, as at 17, but is of different form from the hook portion 16, being curved rearwardly and flanged forwardly, as at 18, to engage in the window groove 14, being preferably tapered to a thin knife edge so that it may be conveniently drawn into the groove as the arms are clamped together, as will presently more fully appear.

At their other ends the arms 10 and 11 are respectively provided with opposed spoon-like ball-gripping spherical portions 19 and 20 having central apertures 21 and 22 therein, and which are adapted to snugly engage about a ball member 23 having a diametric passage 24 therethrough of smaller diameter than the apertures 21 and 22 of the portions 19 and 20.

The rear vision mirror 25 is mounted in a flanged frame 26, dished outwardly at the back and provided at one point with an aperture 27 in which a mounting post 28 is secured, this post being provided with a flange 29 adapted to engage the surface of the frame 26 and a projecting stud 30 engaged in the aperture 27 and secured by heading over as at 31, a washer 32 being interposed between the headed over portion 31 and the inner surface of the frame. The outer surface of the flange 29 is spherically dished, as at 33, to fit snugly upon the convex surface of the gripping portion 20 of the arm 11, and the post is of such diameter as to pass through the aperture 24 of the hole with a relatively close fit, and being therefore substantially smaller than the apertures 21 and 22 of the gripping portions 19 and 20 through which it also passes. The post is threaded at its end and a nut 34 is screwed thereon, the inner surface of which is spherically dished, as at 35, to fit snugly upon the convex surface of the gripping portion 19 of the arm 10.

Upon assembling the parts of the mirror mount to the arms 10 and 11 and tightening the nut 34, it will be seen that the mirror is securely held in adjusted position and may be moved through the universal movement of the ball and post relative to the gripping portions 19 and 20, to any desirable angle upon a slight loosening of the nut, and further that the arms 10 and 11 may be swung toward or away from each other so as to engage or remove the clamping ends relatively to the door frame. The end of the bolt 28 is preferably headed over, as at 38, so as to prevent detachment of the parts, while at the same time permitting sufficient turning of the nut 34 for adjustment of the mirror. It will be noted that the convex shape of the mirror frame 26 permits of a relatively large range of adjustment as the periphery will not contact the arm 11 at as small an angle as would a flat backed frame.

A bolt 36, threaded at each end extends through apertures in the arms near the clamping ends, and is provided with nuts 37—37, which upon being tightened draw the arms toward each other into clamping relation with the frame, it being only necessary to position the knife edge of the flange 18 at the groove 14 to enable the drawing together action to draw it into the groove.

I have illustrated and described a preferred and satisfactory embodiment of my invention, but it will be obvious that changes may be made therein, within the spirit and scope thereof, as defined in the appended claims.

Having thus described my invention what I claim and desire to secure by Letters Patent is:—

1. In a bracket support for attachment to a door frame or the like, a bracket arm comprising a pair of clamping members having clamping means at one end adapted to respectively engage portions of said door frame, means for adjustably drawing said members toward each other to clamp said clamping means, a supported element, and adjustable means at the other end of said clamping members secured to said supported element and connecting said members together, said members being movable independently of each other with respect to said connection, and said adjustable means adapted to have independent angular movement relatively to said members to change the angularity of said supported element.

2. In a bracket support for attachment to a door frame or the like, a bracket arm comprising a pair of clamping members, means at one end of said arm engaging said frame and securing said arm to said frame, a universally movable member disposed between said members at the other end of said arm, clamping means clamping said members against said movable member, and a mirror or other supported element carried by said clamping means.

3. In a bracket support for attachment to a door frame or the like, a bracket arm comprising a pair of clamping members, means at one end of said arm engaging said frame and securing said arm to said frame, said members having opposed concavo-convex portions at the other end of said arm, a ball member disposed between said concavo-convex portions, clamping means disposed about said concavo-convex portions and clamping said members against said ball member, and a mirror or other supported element carried by said clamping means.

4. In a bracket support for attachment to a door frame or the like, a bracket arm comprising a pair of clamping members, means at one end of said arm engaging said frame and securing said arm to said frame, said members having opposed apertured concavo-convex portions at the other ends of said arm, a ball member disposed between said concavo-convex portions and having a diametric passage therethrough, a pair of concave clamping portions engaging the convex surfaces of said respective concavo-convex portions, a shank extending through said apertures of said concavo-convex portions and said passage through said ball member adjustably connecting said concave clamping members and clamping said concavo-convex portions against said ball member, said shank being of smaller diameter than said apertures, and a mirror or other supported element carried by one of said concave clamping members.

HENRY J. SAUER.